(12) United States Patent
Shilane et al.

(10) Patent No.: US 12,158,816 B2
(45) Date of Patent: Dec. 3, 2024

(54) DISTRIBUTED AND DEDUPLICATING FILE SYSTEM FOR STORING BACKUP METADATA TO OBJECT STORAGE

(71) Applicant: Dell Products L.P., Round Rock, TX (US)

(72) Inventors: Philip Shilane, Newtown, PA (US); Abhinav Duggal, Fremont, CA (US); George Mathew, Belmont, CA (US); Chegu Vinod, San Jose, CA (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 17/951,534

(22) Filed: Sep. 23, 2022

(65) Prior Publication Data
US 2024/0103977 A1    Mar. 28, 2024

(51) Int. Cl.
*G06F 16/11* (2019.01)
*G06F 11/14* (2006.01)

(52) U.S. Cl.
CPC ...... *G06F 11/1453* (2013.01); *G06F 11/1464* (2013.01); *G06F 2201/84* (2013.01)

(58) Field of Classification Search
CPC ...... G06F 16/134; G06F 16/13; G06F 16/244; G06F 11/1453; G06F 11/1464; G06F 2201/84; G06F 16/11; G06F 16/14
See application file for complete search history.

(56) References Cited

U.S. PATENT DOCUMENTS

2020/0019475 A1* 1/2020 Karmarkar .......... G06F 12/0864
2022/0019367 A1* 1/2022 Freilich .................. G06F 3/067

* cited by examiner

*Primary Examiner* — Apu M Mofiz
*Assistant Examiner* — Cindy Nguyen
(74) *Attorney, Agent, or Firm* — Dergosits & Noah LLP; Todd A. Noah

(57) ABSTRACT

A distributed and deduplicating file system that stores backup metadata to object storage is described. A node, in a cluster of nodes, receives backup data associated with a write operation to back up a data file, and identifies metadata associated with deduplicated data by deduplicating the backup data. If the access frequency associated with the metadata is greater than or equal to an access threshold, and the size of the metadata is less than or equal to a storage threshold, the cluster writes the metadata to each of the memory devices corresponding to the nodes in the cluster. If the access frequency associated with the metadata is less than the access threshold, or the size of the metadata is more than the storage threshold, the node writes information which includes the metadata to an object storage that stores data objects for the nodes in the cluster.

20 Claims, 7 Drawing Sheets

DISTRIBUTED AND DEDUPLICATING FILE SYSTEM FOR STORING BACKUP METADATA TO OBJECT STORAGE

TECHNICAL FIELD

This disclosure relates to storing digital information, and more particularly, to a distributed and deduplicating file system that stores backup metadata to object storage.

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data file attachment, a data storage system could store all 100 instances of the same 1 MB data file attachment, inefficiently using 100 MB of storage space to store the same 1 MB data file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data file attachment and stores small references to the one stored instance for the 99 subsequent instances.

When being copied from or to a data storage system, a data file or a data object may be divided into data file segments. A data deduplication system can receive data file segments, compare these received data file segments against previously stored data file segments, identify which received data file segments are unique because they have not been previously stored, and store the unique data file segments. When a comparison identifies a received data file segment as a duplicate of a data file segment that has previously been stored as unique, a data deduplication system replaces the duplicate data file segment with a small reference that points to the previously stored data file segment.

A deduplication system typically does not determine whether any such data file segment is a duplicate data file segment or a unique data file segment by directly comparing this data file segment against previously stored data file segments which were previously determined to be unique data file segments. For example, a deduplication system would waste system resources by directly comparing thousands of bytes in each of many data file segments which were formed from a client's data object or data file against thousands of bytes in millions of data file segments which have already been identified and stored as unique data file segments. Instead, a fingerprint may be generated to uniquely identify each data file segment, such as by applying a SHA-1 hash function to create a unique 20-byte fingerprint for each data file segment. Consequently, a deduplication system can conserve system resources by more efficiently comparing 20-byte fingerprints for each of many data file segments formed from a client's data object or data file against 20-byte fingerprints for millions of data file segments which have already been identified and stored as unique data file segments.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
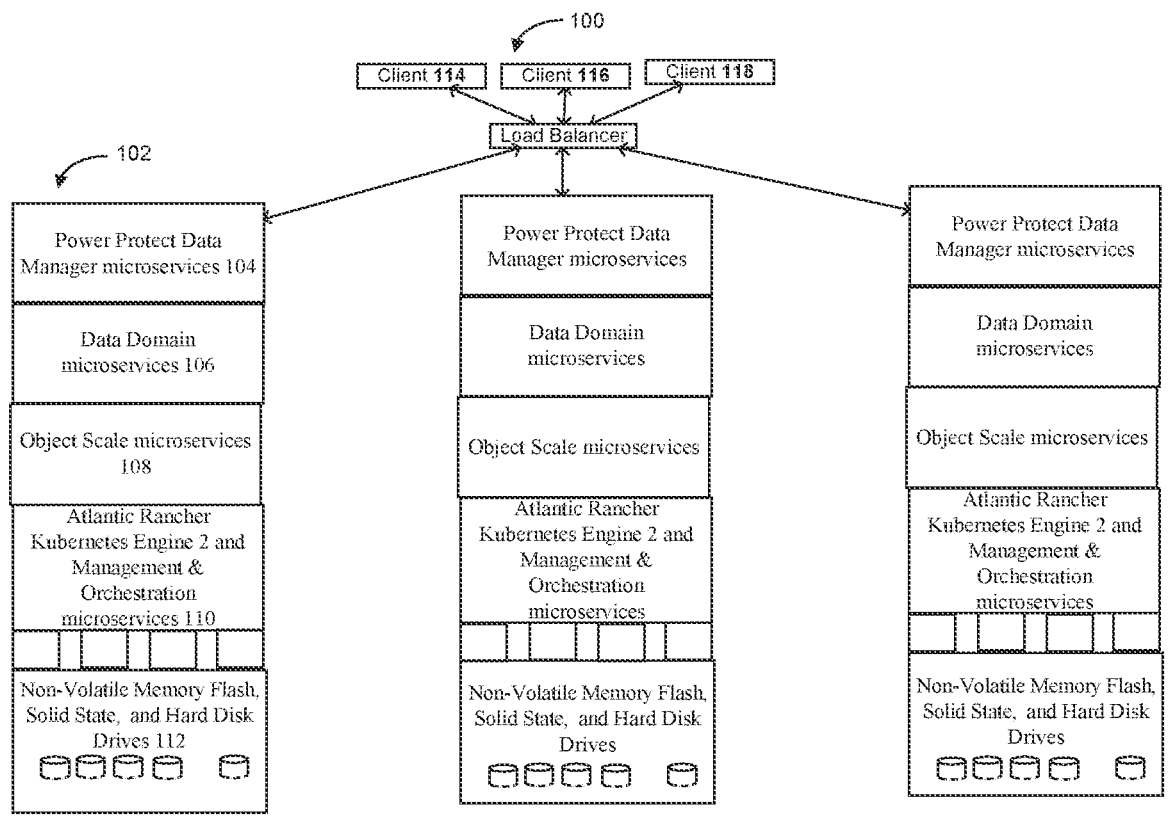
FIG. 1 is a block diagram illustrating parts of an example operating environment for a distributed and deduplicating file system that stores backup metadata to object storage according to one or more embodiments of the disclosure.

In some embodiments, a system (and a computer program product and a method) is described for a distributed and deduplicating file system that stores backup meta data to object storage. A node, in a cluster of nodes, receives backup data associated with a write operation to back up a data file, and identifies metadata associated with deduplicated data by deduplicating the backup data. If an access frequency associated with the metadata is at least an access threshold, and a size of the metadata is at most a storage threshold, the cluster writes the metadata to each memory device corresponding to the nodes in the cluster. If the access frequency associated with the metadata is less than an access threshold, or the size of the metadata is more than a storage threshold, the node writes information, which includes the metadata, to an object storage that stores data objects for the nodes in the cluster.

For example, a node receives a write operation to backup an organization's human relations files. The node uses a deduplication object to identify metadata from the deduplication of the write operation's backup data, with the metadata including a human relations namespace and fingerprints for the deduplicated human relations data file segments. The node identifies the fingerprints for the deduplicated data file segments as metadata that is frequently accessed and a namespace as a type of metadata that is stored with metadata that is frequently accessed. The node determines that the namespace is small enough to be stored in the distributed key value store in flash memory, but that the L1 metadata segment that includes the fingerprints for the deduplicated data file segments is too large to be stored by the metadata tables typically stored in the distributed key value store in flash memory. The node uses the key value store service to update the human relations namespace B-tree that is stored in the distributed key value store in flash memory. One other node becomes the only node in the cluster which stores the large L1 metadata segment, which stores the fingerprints for the deduplicated data file segments in its key value store, which is dedicated to storing frequently accessed metadata which is too large to store in the distributed key value store for all of the nodes in the cluster. The node determines that the size of the information that includes the large L1 metadata segment, which stores the fingerprints for deduplicated data file segments, has accumulated sufficiently to write an optimally sized 16 MB data object to the object storage for the nodes in the cluster. Therefore, the node writes the information which includes the large L1 metadata segment, which stores the fingerprints for the deduplicated data file segments, as an optimally sized 16 MB data object, to the object storage for the nodes in the cluster.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Any of the client devices can take the form of software, physical machines, or virtual machines, or any combination thereof, though no particular device implementation or configuration is required for any embodiment. Similarly, data protection platform components such as databases, storage servers, storage volumes, storage disks, backup servers, restore servers, backup clients, and restore clients can likewise take the form of software, physical machines, or virtual machines, though no particular component implementation is required for any embodiment. Where virtual machines are employed, a hypervisor or other virtual machine monitor may be employed to create and control the virtual machines.

As used herein, the term "data" is intended to be broad in scope. Accordingly, data may include data objects (or objects), data file segments (or segments) such as may be produced by data stream segmentation processes, data chunks, data blocks, atomic data, emails, data files, contacts, directories, sub-directories, volumes, etc. In some embodiments, the terms "file," "data file," "object," and "data object" may be used interchangeably.

In addition, the term "backup" (or "data backups," "backed-up data," etc.) is intended to be construed broadly and includes, but is not limited to, partial backups, incremental backups, differential backups, full backups, clones, snapshots, any other type of copies of data, and any combination of the foregoing. Any of the foregoing may, or may not, be deduplicated. In addition, the storage of data can employ any suitable storage technique, infrastructure, hardware such as a solid-state drive, and/or a hard disk drive, or virtual storage systems provided by a cloud service provider.

Exemplary Environments

An example of parts of a data protection platform's architecture 100 is described herein with reference to FIG. 1. At least some functionality may be provided by, or implemented in connection with, various data protection platforms provided by Dell Technologies, and associated systems, methods, and components, although the use of these particular platforms is provided only by way of illustration and is not required. FIG. 1 depicts a high-level overview of an example three-node cluster architecture for a data protection platform 100. Each node, such as node 102, consists of Power Protect Data Manager (PPDM) microservices 104, Data Domain microservices 106, Object Scale microservices 108, Atlantic Rancher Kubernetes Engine 2, Management & Orchestration microservices 110, and Non-Volatile Memory Flash, Solid State, and Hard Disk Drives 112 to serve the clients 114-118. As more nodes are added, the data protection platform 100 scales Central Processing Units (CPU), Random Access Memory (RAM), storage, and networking accordingly.

Figure 2:
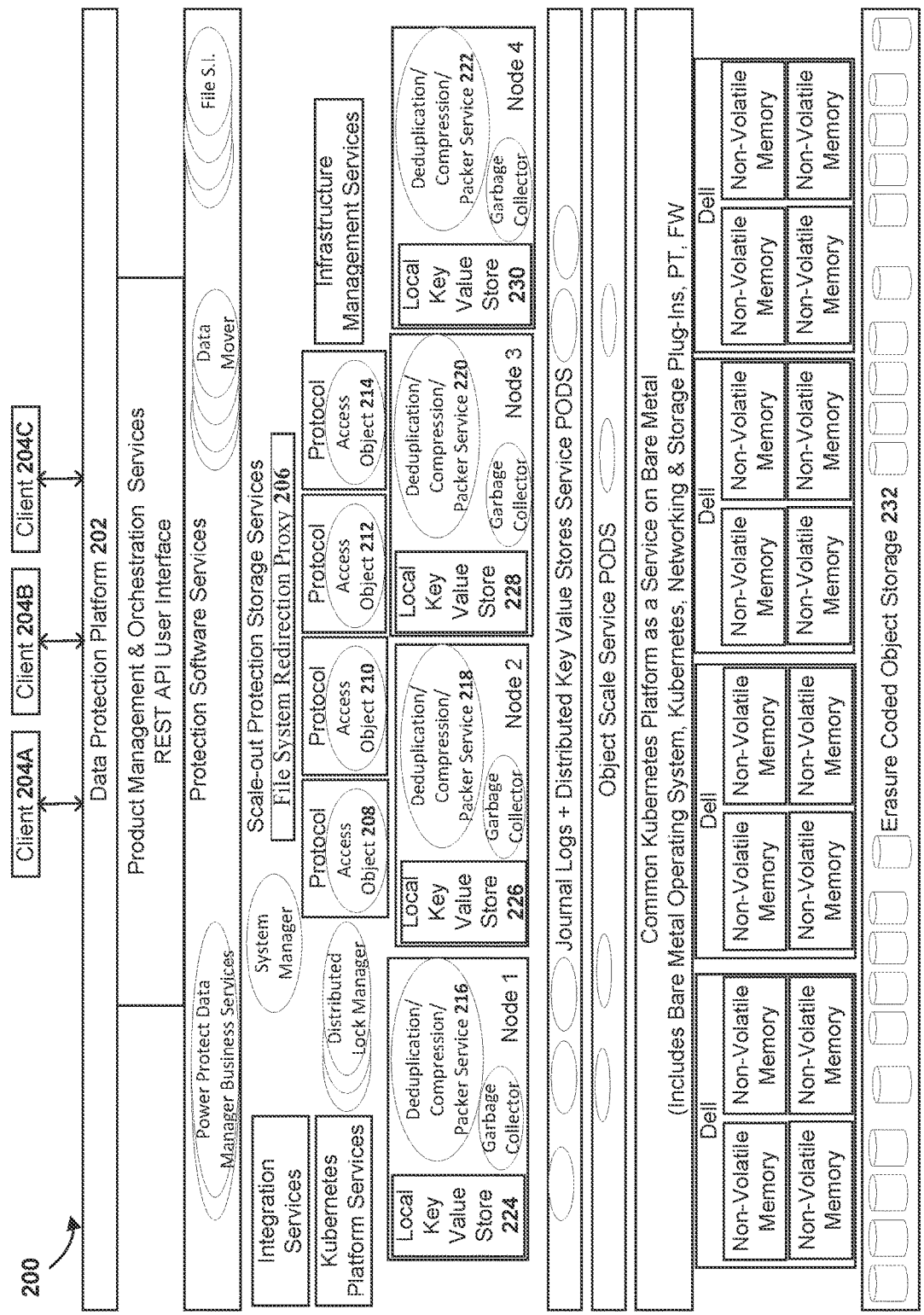
FIG. 2 is a block diagram illustrating an example operating environment for a distributed and deduplicating file system that stores backup metadata to object storage according to one or more embodiments of the disclosure.

FIG. 2 depicts an integrated system architecture 200 for a data protection platform 202, which uses a Power Protect Data Manager to provide backup software functionality, according to one or more embodiments of the disclosure. A clustered storage system, as further described herein, may store backup data (backup data files or backup data objects) within a one or more nodes, as further described herein, and also store metadata for (or associated with) the backup data, and one or more instances of the data file system that catalogs backup data files and other data residing in the clustered environment. In general, the storage of the backup data may be configured to store data backups for the clients 204 A-C, which may be restored in the event of a loss of data. The clustered storage system may be an object storage system that includes object storage, as further described herein.

The data protection platform 202 may include a file system redirection proxy 206 which functions as a load balancer for the clients 204A-C by redirecting file operations in a consistent manner based on a hash of the file handle, path, or other properties to instances of access object services or micro-services 208-214, which direct data to deduplication/compression/packer services or micro-services 216-222, local key value stores 224-230, and object storage 232. The access object services 208-214 handles protocols, the file manager/directory manager, and the content store module, which means that files are segmented and the access object micro-services 208-214 construct the Merkle tree, or LP tree, as described below. FIG. 2 depicts the data protection platform 202 with three clients 204A-C, one file system redirection proxy 206, four access object services 208-214, four deduplication/compression/packer services or microservices 216-222, and four local key value stores 224-230.

However, the data protection platform 202 may include any number of the clients 204A-C, the File System Redirection Proxy 206, any number of the access object services 208-214, any number of deduplication/compression/packer services 216-222, and any number of local key value stores 224-230. Each of the deduplication/compression/packer services 216-222 may be a single service, or may include a deduplication service, a compression service, and a packer service. The data protection platform 202 uses a distributed key value store to hold much of the metadata, such as the namespace B-tree, the LP tree, the fingerprint index, and container fingerprints, which run as containers within the cluster of nodes and are stored to low latency media such as flash memory. The data protection platform 202 can also use a distributed and durable log to store backup data and metadata.

L6 Files or Objects, L1 Segments, & L0 Compression Regions

Figure 3:
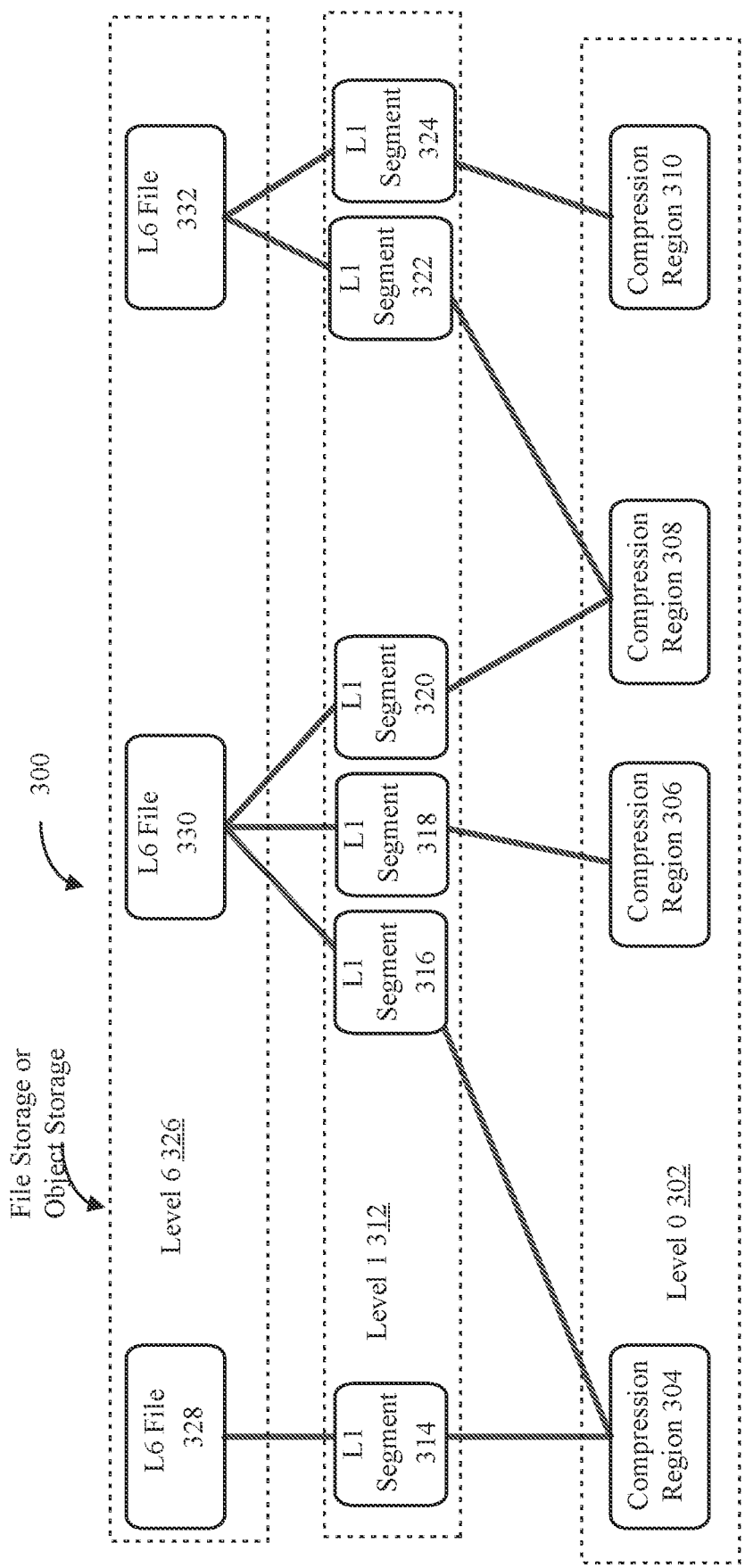
FIG. 3 is a block diagram illustrating relationships between L6 files or objects, L1 segments, and L0 compression regions for a distributed and deduplicating file system that stores backup metadata to object storage according to one or more embodiments of the disclosure.

FIG. 3 depicts that a portion or all of a data file or data object may be represented by a Merkle tree 300 with the bottom level of the Merkle tree 300 representing the data file segments, which may be referred to as level 0 data file segments or Level 0 302 data file segments, which may include compression regions 304-310. Each compression region may store unique data file segments that have been compressed and each compressed data file segment's corresponding unique fingerprint and data file segment size. Large numbers of sequential fingerprints, such as 20-byte SHA-1 fingerprints, generated for sequential data file segments, may be grouped together at the next higher level of the Merkle tree 300 to form groups of fingerprints for data file segments, which may be referred to as a level 1 segment or a L1 segment.

Hundreds of the fingerprints, of the groups of data file segments, that form L1 segments, may be grouped together and hashed as level 2 fingerprints or a L2 segment, and this process of grouping and hashing fingerprints for increasingly larger groups of fingerprints may continue up to level 6 or L6, which represents the entire data file or data object. The top of a Merkle tree 300 is referred to as an L6 file or object, even though it may actually refer to fingerprints for groups of data file segments in a lower numbered level. Fingerprints for segments which are above L0 may be referred to as LP segments, such that the Merkle tree 300 may be referred to as an LP tree.

FIG. 3 depicts that a portion of data file storage or the object storage may be represented by Level 1 312, which may include L1 segments 314-324. Each L1 segment may store metadata that identifies the data object or data file to which a particular L1 segment belongs, a reference to a similarity group identifier, a fingerprint array that stores those fingerprints included in a L1 segment, and the sizes of each data file segment represented by each fingerprint. FIG. 3 depicts that a portion of data file storage or object storage may be represented by Level 6 326, which may include L6 files 328-332.

Since either a sequence of a data file's segments or a sequence of the data file segments' SHA-1 fingerprints may be used for forming a L1 segment and/or determining a similarity group identifier, a source can send these fingerprints without sending these data file segments when L1 segments are to be formed and similarity group identifiers are to be determined. The feature value for a data file segment for forming a L1 segment (such as a hash of the first 64 bytes of the first data file segment for forming a L1 segment) may be used as the basis for determining a similarity group identifier to route the L1 segment to the appropriate one of the deduplication/compression/packer services 216-222. Using a hash of a representative portion of a data file segment as a similarity group identifier can result in L1 segments for data that are similar, but not identical, being routed to the same one of the deduplication/compression/packer services 216-222 that is uniquely responsible for each L1 segment which has a similarity group identifier that is within a range of similarity group identifiers. The net effect of such routing may be to improve deduplication while increasing skew. The similarity group identifier is checked against a mapping table, which leads to consistently routing the L1 segment based on its similarity group identifier to an instance of the deduplication/compression/packer service.

If each similarity group identifier is in the range of 0 to 1,023, and there are four instances of the deduplication/compression/packer service, these four instances may uniquely be responsible for the similarity group identifiers in the ranges 0 to 255, 256 to 511, 512 to 767, and 768 to 1023, though other mappings are possible. The instance of the deduplication/compression/packer service will use the other fingerprints within the same similarity group to deduplicate the fingerprints which correspond to the L0 segments. Other functionality exists in the deduplication/compression/packer service, such as compressing data file segments into compression regions, containers, and blobs that will be packed into an object written to an underlying object storage, such as object scale or an object store.

Figure 4:
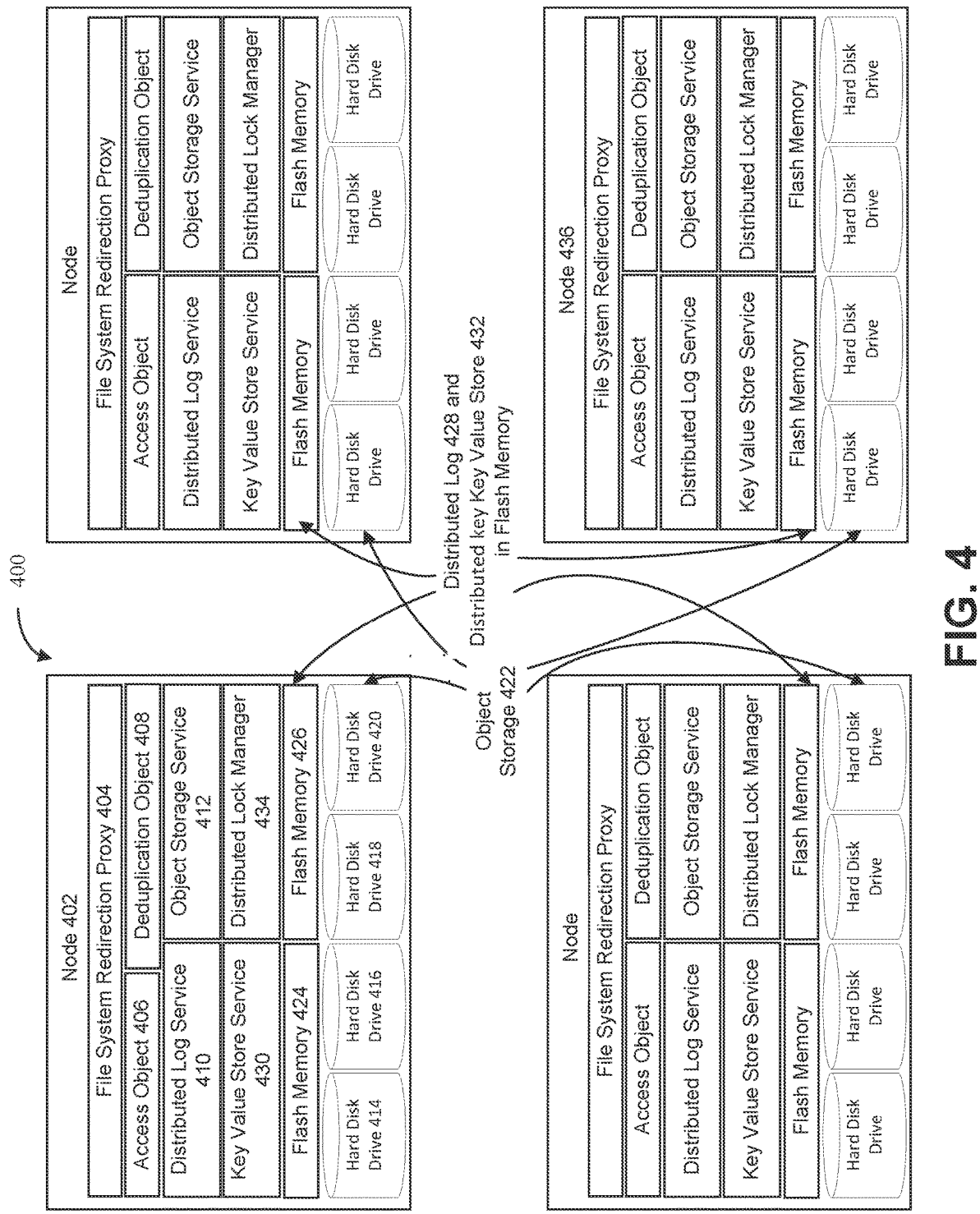
FIG. 4 is a block diagram illustrating an example cluster of nodes for a distributed and deduplicating file system that stores backup metadata to object storage according to one or more embodiments of the disclosure.

FIG. 4 is a block diagram that depicts an example cluster of nodes 400 for a distributed and deduplicating file system that stores backup metadata to object storage. Although FIG. 4 depicts four nodes in the cluster of nodes 400, a distributed and deduplicating file system would typically have more nodes to provide higher failure tolerance. Within each node, such as the node 402, there are multiple software components running as pods within Kubernetes.

Clients, such as the clients 114-118 depicted by FIG. 1 and/or the clients 204A-C depicted by FIG. 2, access a file system redirection proxy, such as the File System Redirection Proxy 404 in the node 402, during write and read operations. The File System Redirection Proxy 404 provides consistent routing by using a hash of the client's content handle as the routing key to direct clients to an access object, such as the Access Object 406, for further processing. The File System Redirection Proxy 404 also maintains state for client operations that span multiple calls to provide consistent routing. By directing read and/or write operations to the Access Object 406 consistently, the File System Redirection Proxy 404 thereby reduces the number of locks that need to be accessed and allows state to be cached in memory versus retrieving it from slower media. The Access Object 406 also provides file system level operations, such as creating a namespace and files.

For file write operations, the Access Object 406 splits a file into multi-MB units, such as the amount of data spanned by a L1, adds identifiers for the multi-MB units, and calculates a similarity group that is used for routing the multi-MB units to a deduplication object, such as the Deduplication Object 408. The Deduplication Object 408 primarily performs deduplication for a set of similarity groups. Each L1 consists of hundreds of L0 segments, and the Deduplication Object 408 deduplicates those hundreds of L0 segments by comparing their fingerprints to fingerprints of the segments which were previously determined to be unique and each have a similarity group identifier as the L0 segment being deduplicated. For the unique fingerprints, the Deduplication Object 408 compresses the segments and writes the compressed segments to the distributed log service 410 which temporarily buffers the compressed segments in a post-deduplication distributed log before eventually packing the compressed segments into larger objects (such as 16 MB objects) and writing the larger objects to the object storage 422.

The Object Storage 422 is provided by multiple object storage components that are represented by the Object Storage Service pod 412, which uses hard disk drives, such as hard disk drives 414-420, across the nodes within the cluster 400 to provide a highly available object storage 422. The Object Storage Service 412 writes objects which are erasure encoded to the object storage 422 and/or replicated across multiple nodes to provide availability guarantees. The distributed and deduplicating file system expands the object storage 422 by adding additional nodes with additional hard disk drives, which provide high capacity and low-cost storage.

The latency of read and write operations for the object storage 422 may be on the order of tens of milliseconds, which is depicted by FIG. 4 as deployed on-premises. In an on-premises deployment, the cluster 400 of nodes provides the object storage service 422 which uses hard disk drives, which may include the hard disk drives 414-420. However, in a cloud deployment the cloud provider would provide any object storage service and storage devices, such that the latency of object read and write operations may require hundreds of milliseconds when communicating with the cloud.

The distributed log service 410 utilizes flash memory, such as flash memory 424-426, across multiple nodes to store a low latency post-deduplication distributed log 428. Clients of the distributed log service 410 quickly write data or metadata that will be persisted in the distributed log 428 across multiple nodes, which provides availability in case hardware or software failures occur. The flash memory 424-426 has a lower latency than the hard disk drives 414-420 (a few milliseconds versus tens or hundreds of milliseconds), but due to the more expensive cost of the flash memory 424-426 relative to the less expensive hard disk drives 414-420, the flash memory 424-426 has a substantially lower storage capacity.

The key value store service 430 is another distributed service, which stores key-value entries in the distributed key value store 432 provided by flash memory for low latency. By writing to multiple nodes, the key value store service 430 provides availability in the event of failures. Like the distributed log service 410, the key value store service 430 has low latency relative to hard disk drives. The distributed lock manager 434 provides exclusive access to resources with a locking mechanism. The distributed key value store 432 in the flash memory stores the state of the locks to protect against failures.

The Object Storage 422 is designed to handle fairly large (such as multiple MB) write operations with lower latency and higher throughput than smaller write operations. The reason is that larger write operations may be directly erasure encoded and written to multiple hard disk drives on multiple nodes, whereas smaller write operations are often replicated to multiple hard disk drives until sufficient data is buffered so their data may be written in an erasure-coded format. For some on-premises implementation, write operations need to store 16 MB of information to achieve the best object storage performance. For these reasons, the distributed and deduplicating file system can implement two optimizations to accelerate write operations so the distributed and deduplicating file system can persist client data and quickly acknowledge write operations. First, if the write operation's write pattern involves small, random writes, the latency would be high to write these small, random writes to the Object Storage 422.

Instead, the distributed and deduplicating file system handles this write operation's write pattern by temporarily buffering the write operation's data and/or metadata into the distributed log 428, which can immediately acknowledge the write operation was successful. Then the distributed and deduplicating file system continues to process the data in the normal write operation path and the data is eventually written to the Object Storage 422 and may be freed from the distributed log 428. The second write operation's write pattern is a typical backup file write operation that involves large, sequential writes. A client periodically wants to synchronize their data and confirm that the write operation's information has actually been safely stored. However, writing at the moment of a synchronization to the Object Storage 422 would have high latency.

Instead, the distributed and deduplicating file system buffers the post-deduplication compression regions to the distributed log 428. The distributed and deduplicating file system keeps the compression regions separated by similarity group and buffered in the distributed log 428 until sufficient data has been accumulated in the distributed log 428 to create a 16 MB object (which is an example of a size that is dependent on object storage properties) consisting internally of many compression regions, which the distributed and deduplicating file system then writes to the Object Storage 422. After the 16 MB object is persisted to the Object Storage 422, the distributed and deduplicating file system can release the 16 MB object from the distributed log 428.

Over time, system users delete their older backup files, and the distributed and deduplicating file system needs to remove data from storage that is no longer referenced by live files. As part of the distributed and deduplicating file system, a garbage collection process determines which portions of the data objects are no longer referenced and can therefore be safely removed. Since data objects are idempotent, to free space, the distributed and deduplicating file system needs to apply a complex algorithm to copy the live data regions forward into newly created data objects, before it can safely remove the older data objects that were partially dead.

A key issue is that the Object Storage 422 also performs its own version of garbage collection because, in typical use cases, a client's data objects do not map directly to the internally managed structures, called chunks. Therefore, when a system user deletes a data object, this deletion internally results in the object storage's garbage collection cleaning one or more chunks. For the distributed and deduplicating file system, this could result in double the number of garbage collection runs, one garbage collection run at the file system level and another garbage collection run within the Object Storage 422.

Instead, the distributed and deduplicating file system aligns the write operation's size (16 MB) to the internal chunk size. So, when the distributed and deduplicating file system determines that a data object which the distributed and deduplicating file system had previously written can now be deleted, the Object Storage 422 can release the data object without the need to perform any copy-forward. This elimination of any copy-forward process reduces computational and Input/Output overheads relative to running both garbage collection processes in a naïve manner. The garbage collection at the upper file system level may still require performing a copy-forward process, but only one round of garbage collection is required when the upper file system layer has aligned its write size to match the write size of the object storage 422. The distributed and deduplicating file system can use this optimization for the on-premises production, but this optimization is not directly applicable to cloud object storage systems.

In order to compensate for the high latency of the Object Storage 422, the distributed and deduplicating file system optimizes its metadata to leverage flash memory, such as the flash memory 424-426, as much as possible. The File System Redirection Proxy 402 provides consistent routing for a client to access the Access Object 406. This consistent routing helps reduce latency since the Access Object 406 either already has a lock on the folder being accessed or can get a lock without waiting for a different access object to release the lock.

While processing a file's write operation, the Access Object 406 adjusts the namespace and builds up the file's LP tree in memory, so consistently routing the write operations to the Access Object 406 enables updates to the LP tree to mostly occur in memory. The distributed and deduplicating file system writes these metadata structures to the distributed key value store 432 for low latency. As the Access Object 406 forms L1s and calculates similarity groups, the Access Object 406 routes the L1s to the appropriate deduplication object, such as the deduplication object 408, based on the corresponding similarity group.

The deduplication object 408 performs deduplication of the fingerprints for an L1's segments against the fingerprints already written for segments which each have a similarity group identifier which is in the same group of similarity group identifiers as the L1 segment that is being deduplicated. The distributed and deduplicating file system stores the fingerprint index for the similarity group and the fingerprint caching structures in the distributed key value store 432 for low latency instead of using the object storage 422, since this metadata is frequently accessed and small relative to the data. For any segments that are determined to be unique, the deduplication object 408 forms a compression region to further reduce space requirements, packs the compression region with other compression regions into a packed data object, and then stores the packed data object which includes the unique segments to the object storage 422 for persistence. The distributed and deduplicating file system attempts to keep most metadata in flash memory, such as flash memory 424-426, since metadata latency may become a bottleneck. Since the key value store 432 is distributed, any pod can access the metadata.

As more nodes are added to the cluster of nodes or pods restart on different nodes, the distributed metadata in the distributed key value store 432 may be accessed instead of storing it locally in a single node. There is a trade-off when using flash memory between latency, availability, and cost. The distributed and deduplicating file system keeps the smaller metadata tables distributed across the flash memory of multiple nodes, which minimizes latency and maximizes availability. The cost is acceptable since these are smaller metadata tables and fit within the distributed and deduplicating file system's flash memory budget.

There are other metadata tables that are much larger (such as the L1 segments), where the distributed and deduplicating file system does not have the budget for sufficient flash memory to follow the same design. Instead, the distributed and deduplicating file system places these tables in the flash memory of a single node to provide low latency and control the cost. There is an availability risk, though, if this node fails. To address that issue, the distributed and deduplicating file system mirrors this table in a single node to the object storage 422 to provide availability. Write operations to the object storage 422 are batched and can support high throughput, while read operations are quickly served by the version of this table in flash memory, such as the flash memory 424-426.

While the distributed and deduplicating file system attempts to keep most of the metadata in flash memory, deduplication increases the size of the metadata relative to a non-deduplicating file system with the same capacity. If the distributed and deduplicating file system achieves 20× deduplication (which is common for backup storage), the distributed and deduplicating file system has 20× more metadata than would normally be associated with the distributed and deduplicating file system's storage capacity. For this reason, the distributed and deduplicating file system can tier metadata to the object storage 422 when the distributed and deduplicating file system has used all of its flash capacity. In order to create a scale-out distributed and deduplicating file system, the distributed and deduplicating file system leverages the object storage 422 for its high availability and scale-out properties. The distributed and deduplicating file system adjusts its write size to maximize the throughput for the object storage 422 and to reduce garbage collection overheads.

The distributed and deduplicating file system has new metadata acceleration components for the distributed locks, namespace, file metadata, fingerprints, and other metadata structures to avoid the higher latency of the object storage 422. Even for data, the distributed and deduplicating file system has added a distributed log, such as the distributed log 428, with low latency to enable system users to quickly persist data and buffer a sufficient amount before writing to the object storage 422.

Figure 5A:
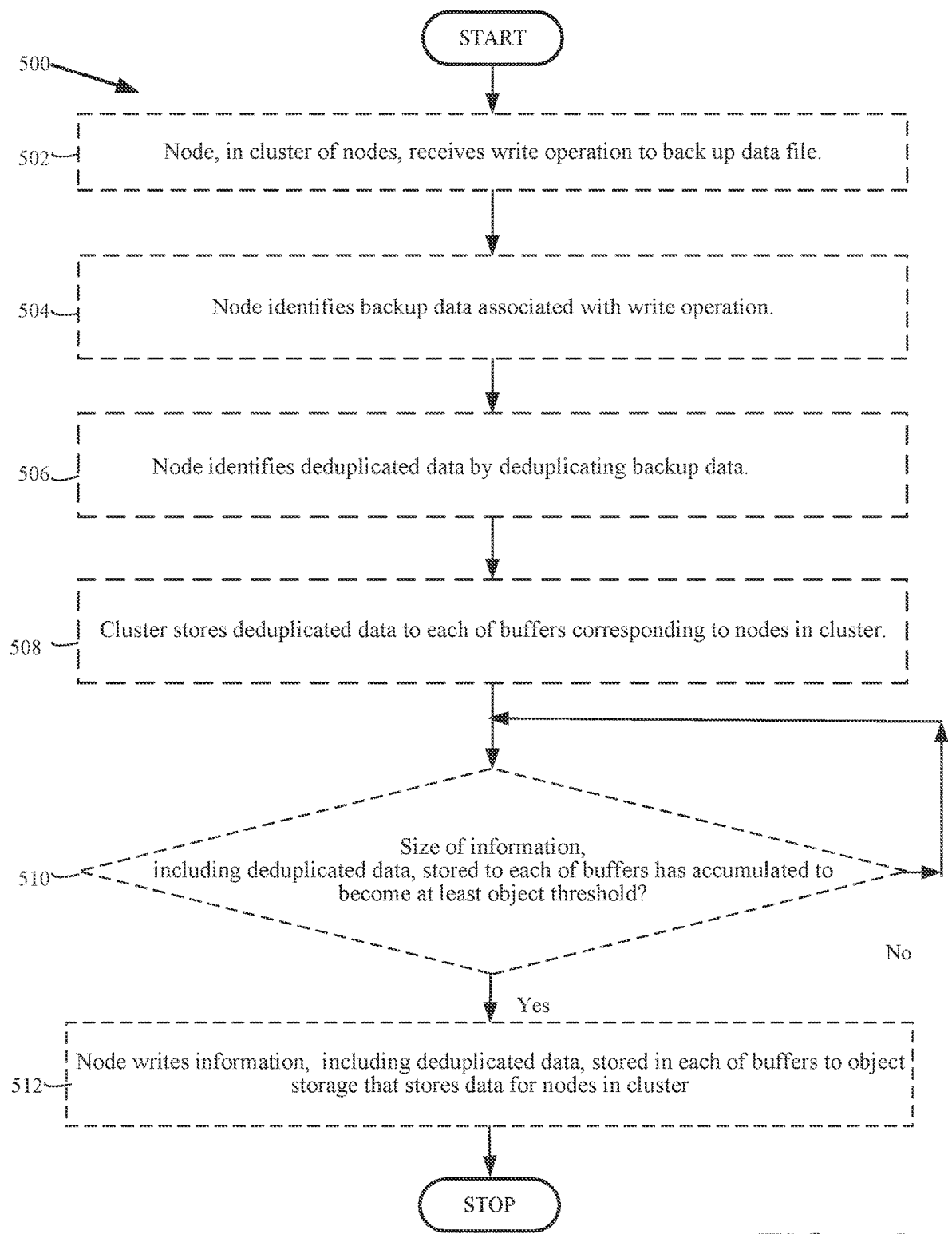
FIG. 5A is a block diagram illustrating an example method for a distributed and deduplicating file system that stores backup data to object storage according to one or more embodiments of the disclosure.

FIG. 5 depicts flowcharts that illustrate methods for a distributed and deduplicating file system that stores backup data and backup metadata to object storage, under an embodiment. The flowcharts 500 and 520 illustrate method acts as flowchart blocks for certain steps involving the client's 114-118 of FIG. 1 or the clients 204A, B, or C of FIG. 2 and the cluster of nodes 400 of FIG. 4. FIG. 5A depicts the flowchart 500 as a method for a distributed and deduplicating file system that stores backup data to object storage, with the method acts illustrated as flowchart blocks 502-512.

A node, in a cluster of nodes, optionally receives a write operation to back up a data file, block 502. The distributed and deduplicating file system can receive a write operation which should be optimized. For example, and without limitation, this can include the node 402 receiving a write operation to backup an organization's human relations files.

A node can be a computer that manages access to a centralized resource in a network. A cluster can be a set of loosely or tightly connected computers that work together so that, in many respects, they are viewed as a single system. A write operation can be an instruction that causes a computer to store data on a digital resource. A data file can be a collection of information stored in a computer's memory or on a storage device under a single identifying name.

After receiving a write operation, a node optionally identifies backup data associated with the write operation, block 504. The distributed and deduplicating file system can identify the backup data specified by the write operation. By way of example and without limitation, this can include the node 402 identifying a human relations data file specified for backup by the write operation. Backup data can be an extra copy of information from a computer.

Following the identification of backup data, a node optionally identifies deduplicated data by deduplicating the backup data, block 506. The distributed and deduplicating file system can deduplicate backup data which will be stored optimally. In embodiments, this can include the node 402 using the deduplication service 408 to identify which of the backup data file's segments are unique data segments that had not been previously stored by the cluster 400. Deduplicated data can be information from which redundant information has been eliminated.

Having deduplicated the backup data, a cluster optionally stores the deduplicated data to each node's buffer, block 508. The distributed and deduplicating file system can buffer deduplicated data that is not big enough to be stored as an object store's optimal sized data object. By way of example and without limitation, this can include the cluster 400 using the distributed log service 410 to write the unique data file's segments to the distributed log 428 which is stored in flash memory, such as the flash memory 424 and the flash memory 426.

A buffer may be implemented by a flash memory device. For example, the distributed log 428 in flash memory can function as a buffer when writing data to the object storage 422. A buffer can be a temporary memory area in which data is stored while it is being processed or transferred.

Having buffered deduplicated data, a node optionally determines whether the size of information, which includes the deduplicated data, stored to each buffer has accumulated to become at least the object threshold, block 510. The distributed and deduplicating file system can determine if enough data has been buffered for writing an optimally sized data object to object storage. In embodiments, this can include the node 402 determining whether the size of the information, which includes the deduplicated data, buffered to the distributed log 428 has accumulated sufficiently to write an optimally sized 16 MB data object to object storage 422. If the size of the information stored to each buffer has accumulated to become more than the object threshold, the method 500 continues to block 512 to write the buffered information to object storage. If the size of the information stored to each buffer has not accumulated to become more than the object threshold, the method 500 continues checking until enough buffered information has accumulated.

Information can be data. A size can be the magnitude of a group of information. An object threshold can be the magnitude that must be exceeded or met for a certain result to occur in a data construct.

If each buffer has accumulated enough information, a node optionally writes the information stored in each buffer to object storage, block 512. The distributed and deduplicating file system can write the buffered information as an optimally sized data object to object storage. For example, and without limitation, this can include the node 402 using the Object Storage Service 412 to write the information, including the deduplicated data, buffered in the distributed log 428, as an optimally sized 16 MB data object, to the object storage 422. After the node 402 uses the Object Storage Service 412 to write information buffered in the distributed log 428 to the object storage 422, the node 402 can free or release all of the data from the information stored in the distributed log 428, but can also cache selected data which was in the distributed log 428, to the flash memory 426, such as if the selected data will be frequently accessed and/or is small enough to be cached to the flash memory 426.

A node can identify the quantity of the information which equals the object threshold, and write the quantity of the information to the object storage. For example, even if the size of the information that buffered in the distributed log 428 is greater than 16 MB, the node 402 writes only 16 MB of the information to the object storage 422. The quantity of the information can include a packed object created by compressing the deduplicated data into a compression region, and packing the compressed region with other compressed regions. For example, the information buffered to the distributed log 428 includes the unique data segments in the human relations data file, which the deduplication object 408 compressed into compression regions and packed into a 16 MB data object. If the amount of buffered data is within a threshold less than the optimal size (e.g. 16 MB), the data may be padded with a specified buffer pattern such as all zeros to reach the optimal size and then written to the object storage 422.

A quantity can be a count of something. A compression region can be an area where the size of data is reduced. A data structure can be a specialized format for organizing, processing, retrieving and storing information. A packed object can be a collection of entities which are stored efficiently.

The object threshold may be based on a size of a data structure which is internally managed as a chunk in the object storage. For example, since the object storage 422 is designed to manage 16 MB chunks, the optimal size of data objects written to the object storage 422 is 16 MB. The object storage can store data in hard disk drives. For example, the object storage 422 writes data objects to the hard disk drives 418 and 420.

Object storage can be a specific type of retention in a computer of retrievable data constructs that that may be used by the computer. A chunk can be a set of data which is sent to a processor or one of the parts of a computer for processing. A file system can be a method for storing and organizing computer containers and the data they contain. A hard disk drive can be a non-volatile data storage device.

Using the object threshold to write the information to the object storage can enable the object storage to respond to a determination that a data object was written and then deleted by the file system by releasing the data object without needing to perform any copy-forward process on the data object. For example, since the node 402 wrote the 16 MB data object of buffered information to the object storage 422, if the node 402 subsequently deletes this data object, the object storage 428 does not have to perform any copy-forward process on the data object, which would be typically required by the object storage 428 for garbage collection. The garbage collection at the upper file system level may still require performing a copy-forward process, but only one round of garbage collection is required when the upper file system layer has aligned its write size to match the write size of the object storage 422. A data object can be a region of storage that contains a value or group of values. A copy-forward process can be a method which replicates the live data regions where data objects are newly created.

Figure 5B:
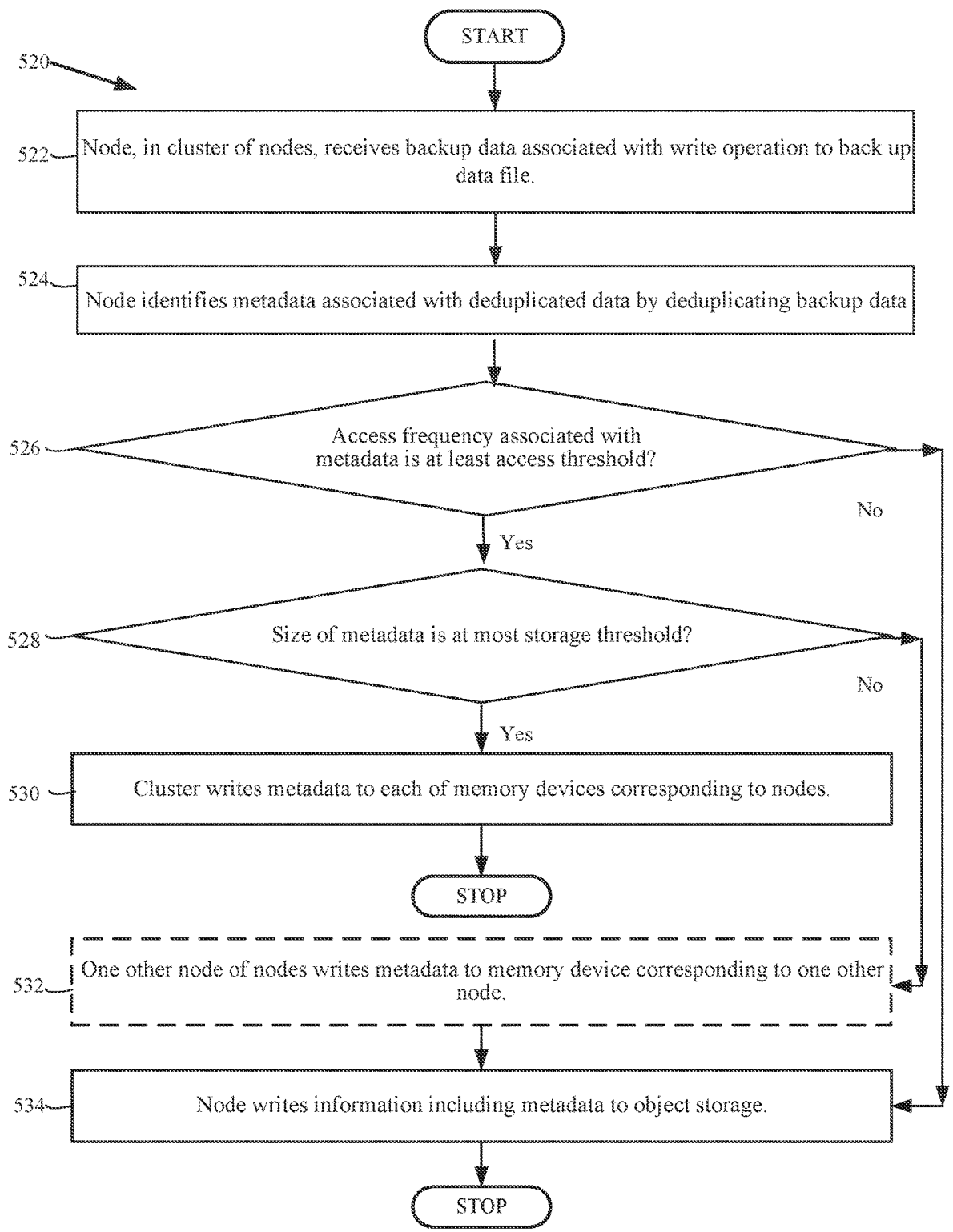
FIG. 5B is a block diagram illustrating an example method for a distributed and deduplicating file system that stores backup metadata to object storage according to one or more embodiments of the disclosure.

Although FIG. 5A depicts the blocks 502-514 occurring in a specific order, the blocks 502-514 may occur in other orders. In other implementations, each of the blocks 502-514 may also be executed concurrently and/or in combination with other blocks and/or some blocks may be divided into a different set of blocks. FIG. 5B depicts the flowchart 520 as a method for a distributed and deduplicating file system that stores backup metadata to object storage, with the method acts illustrated as flowchart blocks 522-534.

A node, in cluster of nodes, receives backup data associated with a write operation to back up a data file, block 522. The distributed and deduplicating file system receives a write operation's backup data which should be processed optimally. For example, and without limitation, this can include the node 402 receiving a write operation to backup an organization's human relations files.

After receiving backup data, a node identifies metadata associated with deduplicated data by deduplicating the backup data, block 524. The distributed and deduplicating file system deduplicates a write operation's backup metadata. By way of example and without limitation, this can include the node 402 using the Deduplication Object 408 to identify metadata from the deduplication of the write operation's backup data, with the metadata including a human relations namespace and fingerprints for the deduplicated human relations data file segments.

Following the identification of metadata from deduplicating the backup data, a node optionally determines whether an access frequency associated with the metadata is at least an access threshold, block 526. The distributed and deduplicating file system can determine whether deduplicated data needs to be written in flash memory because it will be accessed frequently. In embodiments, this can include the node 402 identifying fingerprints for deduplicated data file segments as metadata that will be frequently accessed. The node 402 can also identify a namespace as a type of metadata that may not be frequently accessed, but should be stored in the distributed key value store 432 with metadata that will be frequently accessed. An access frequency can be an expected measure of utilizing the right or opportunity to use or benefit from something. An access threshold can be the magnitude that must be exceeded or met by an expected measure for utilizing the right or opportunity to use or benefit from something.

If an access frequency associated with the metadata is at least an access threshold, the method 520 continues to block 528 to determine whether the metadata is small enough to be written in flash memory. If an access frequency associated with the metadata is less than an access threshold, the method 520 proceeds to block 534 to write the metadata to object storage.

If an access frequency associated with the metadata is at least an access threshold, a node determines whether a size of the metadata is at most a storage threshold, block 528. The distributed and deduplicating file system determines whether the metadata is small enough to be written to flash memory. For example, and without limitation, this can include the node 402 determining that the namespace is small enough to be stored in the distributed key value store 432 in flash memory, but that the L1 metadata segment that includes the fingerprints for the deduplicated data file segments is too large to be stored by the metadata tables typically stored in the distributed key value store 432 in flash memory. A storage threshold can be the magnitude that must be exceeded or met for a certain result to occur or value retained.

Determining whether the size of the metadata is not more than a storage threshold may include determining whether the size of the metadata is more than an available capacity in each of the memory devices where the metadata might be stored. For example, the node 402 determines that the size of the L1 metadata segment which stores unique fingerprints for data file segments requires more storage space than is currently available in the distributed key value store 432. Available capacity can be the ability or power to do, use, obtain, or understand something.

If a size of the metadata is at most a storage threshold, the method 520 continues to block 530 to write the metadata to flash memory. If a size of the metadata is more than a storage threshold, the method 520 proceeds to blocks 532 and 534 to write the metadata to object storage.

If the metadata is small enough, a cluster writes the metadata to each of the memory devices corresponding to the nodes, in the cluster block 530. The distributed and deduplicating file system writes frequently used and sufficiently small metadata to a distributed key value store in flash memory. By way of example and without limitation, this can include the node 402 using the key value store service 412 to update the human relations namespace B-tree that is stored in the distributed key value store 432 in flash memory. Then the method 520 terminates to be ready for the next write operation.

Each memory device may be a flash memory device. A memory device can be a computer's data storage unit. A flash memory device can be an electronic non-volatile computer storage medium that can be electrically erased and reprogrammed.

If the metadata is expected to be frequently accessed, but the metadata's size is too large for the budgeted flash memory, then one other node, in the cluster, optionally stores the metadata to a memory device corresponding to the one other node, block 532. The distributed and deduplicating file system stores one copy of a metadata table which is too large to be stored in every node's flash memory into a single node's flash memory. In embodiments, this can include the node 436 becoming the only node in the cluster 400 which stores the large L1 metadata segment, which stores the fingerprints for the deduplicated data file segments in its key value store, which is dedicated to storing frequently accessed metadata which is too large to store in the distributed key value store 432 for all of the nodes in the cluster 400.

If the metadata is not expected to be frequently accessed, or if the metadata's size is too large for the budget of flash memory, then a node writes information comprising the metadata to an object storage that stores data objects for the nodes, block 534. The distributed and deduplicating file system writes metadata to object storage because the metadata will not be frequently accessed or is too large to be stored in the budgeted flash memory. For example, and without limitation, this can include the node 402 determining that the size of the information that includes the large L1 metadata segments, which stores the fingerprints for the deduplicated data file segments, has accumulated sufficiently to write an optimally sized 16 MB data object to the object storage 422 for the nodes in the cluster. Therefore, the node 402 uses the Object Storage Service 412 to write the information which includes the large L1 metadata segment, which stores the unique fingerprints for the deduplicated data file segments, as an optimally sized 16 MB data object, to the object storage 422 for the nodes in the cluster 400.

The object storage 422 may store metadata in any number of hard disk drives. For example, the object storage 422 stores the Large L1 metadata segment in the hard disk drive 414. Writing information which includes the metadata to the object storage may include identifying a quantity of the information, which includes the metadata, and which equals an object threshold, and then writing the quantity of the information, which includes the metadata, to the object storage. For example, the node 402 determines that a small L1 metadata segment which is stored in the distributed key value store 432 is becoming significantly larger, such that the node 402 removes the copy of the small L1 metadata segment from the distributed key value store 432 in the node 402.

Then the node 402 copies the growing L1 metadata segment to the node 436, which only stores frequently accessed data which is too large for storage in the distributed key value store 432, and to the object store 422 as well. While this preceding example illustrates the node 402 dynamically changing the status of the size of metadata, the node 402 can also dynamically change the status of the access for the metadata, such as determining that some frequently accessed metadata had become significantly less frequently accessed metadata.

Similarly, specific metadata may be stored in flash memory because the specific metadata was the most recently used metadata by the node 402. However, as time passes without this specific metadata being accessed again, the cluster 400 may remove this specific metadata from all of the node's distributed key value store 432. Since this metadata is too small to be directly stored optimally in the object store 422, the node 402 stores the specific metadata to the distributed log 428. There the specific metadata accumulates with deduplicated data and other metadata until a comparison with the object threshold indicates that 16 MB of information is buffered in the distributed log 428, and the node 402 writes this buffered information as an optimally sized 16 MB data object to the object storage 422 for the nodes in the cluster 400.

Using an object threshold to write information comprising the metadata to object storage may enable the object storage to respond to a determination that a data object was written and then deleted by a file system by releasing the data object without needing to perform any copy-forward process on the data object. For example, the node 402 writes a 16 MB data object of information, which includes the metadata from deduplicating the backup data, to the object storage 422. If the node 402 subsequently deletes this data object, the object storage 428 does not have to perform any copy-forward process on the data object, which would have been typically required by the object storage 428 for garbage collection.

Although FIG. 5 depicts the blocks 522-534 occurring in a specific order, the blocks 522-534 may occur in other orders. In other implementations, each of the blocks 522-534 may also be executed concurrently and/or in combination with other blocks and/or some blocks may be divided into a different set of blocks.

Exemplary Computing System

Figure 6:
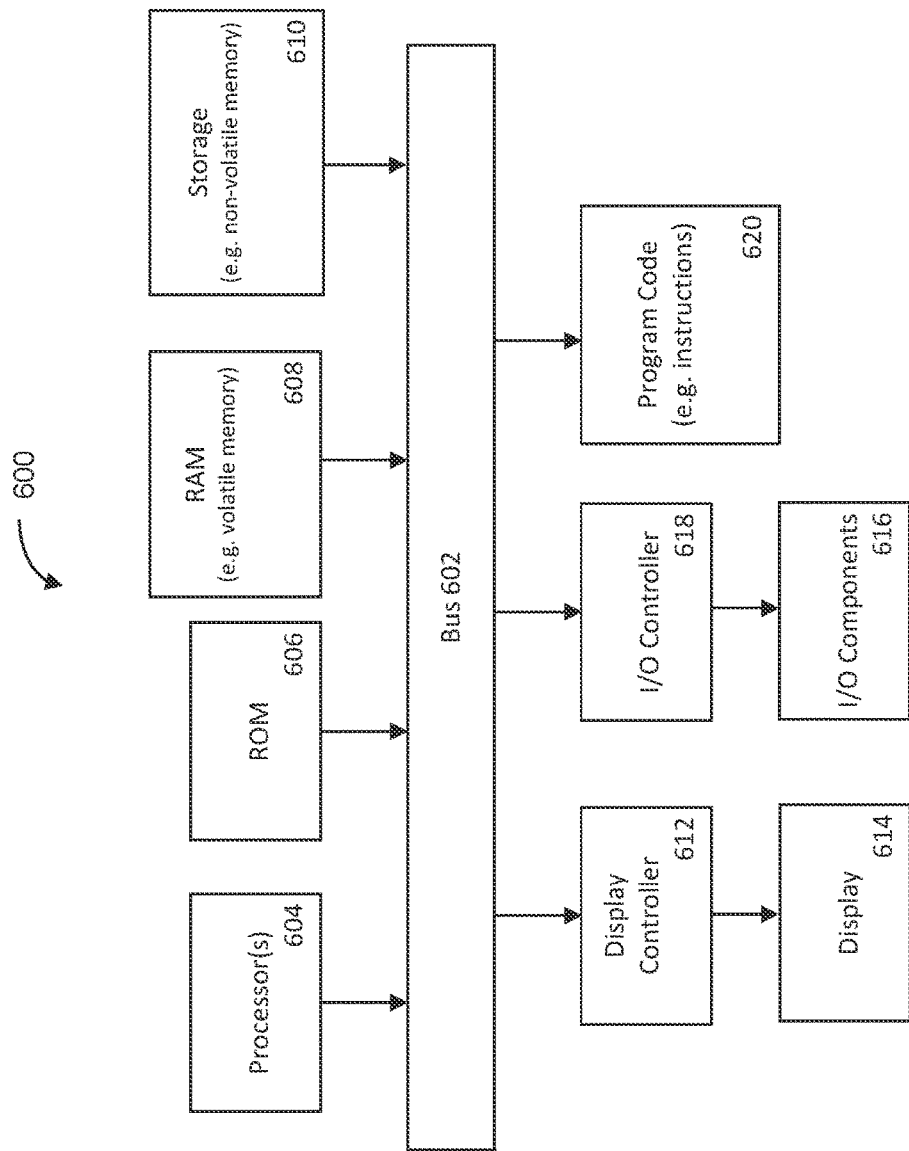
FIG. 6 is a block diagram illustrating a computing system for a distributed and deduplicating file system that stores backup metadata to object storage according to one or more embodiments of the disclosure.

FIG. 6 shows a block diagram of an example of a computing system that may be used in conjunction with one or more embodiments of the disclosure. For example, computing system 600 (or system, or server, or computing device, or device) may represent any of the devices or systems described herein that perform any of the processes, operations, or methods of the disclosure. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 602 which may be coupled to a processor 604, ROM (Read Only Memory) 606, RAM (or volatile memory) 608, and storage (or non-volatile memory) 610. The processor(s) 604 may retrieve stored instructions from one or more of the memories 606, 608, and 610 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 604 may perform operations in an on-demand or "cloud computing" environment or as a service, such as within a "software as a service" (SaaS) implementation. Accordingly, the performance of operations may be distributed among the one or more processors 604, whether residing only within a single machine or deployed across a number of machines. For example, the one or more processors 604 may be located in a single geographic location (such as within a home environment, an office environment, or a server farm), or may be distributed across a number of geographic locations.

The RAM 608 may be implemented as, for example, dynamic RAM (DRAM), or other types of memory that require power continually in order to refresh or maintain the data in the memory. Storage 610 may include, for example, magnetic, semiconductor, tape, optical, removable, non-removable, and other types of storage that maintain data even after power is removed from the distributed file system. It should be appreciated that storage 610 may be remote from the distributed file system, such as accessible via a network.

A display controller 612 may be coupled to the bus 602 in order to receive display data to be displayed on a display device 614, which can display any one of the user interface features or embodiments described herein and may be a local or a remote display device. The computing system 600 may also include one or more input/output (I/O) components 616 including mice, keyboards, touch screen, network interfaces, printers, speakers, and other devices. Typically, the input/output components 616 are coupled to the distributed file system through an input/output controller 618.

Program code 620 may represent any of the instructions, applications, software, libraries, toolkits, modules, components, engines, units, functions, logic, etc. as described herein. Program code 620 may reside, completely or at least partially, within the memories described herein (such as non-transitory computer-readable media), or within a processor during execution thereof by the computing system. Program code 620 may include both machine code, such as produced by a compiler, and files containing higher-level or intermediate code that may be executed by a computing system or other data processing apparatus (or machine) using an interpreter. In addition, program code 620 may be implemented as software, firmware, or functional circuitry within the computing system, or as combinations thereof. Program code 620 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (such as any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In addition, the use of the term "or" indicates an inclusive or (such as "and/or") unless otherwise specified. For example, the phrase "at least one of x, y, or z" means any one of x, y, and z, as well as any combination thereof. In addition, the term "based on" is used to describe one or more factors that affect a determination.

These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A distributed and deduplicating file system that stores backup metadata to object storage, comprising:
   one or more processors; and
   a non-transitory computer readable medium storing a plurality of instructions, which when executed, cause the one or more processors to:
   identify, by a node in a cluster of a plurality of nodes, metadata associated with deduplicated data by deduplicating backup data, in response to receiving the backup data associated with a write operation to back up a data file;
   determine a frequency at which the metadata will be accessed and a size of the metadata in response to identifying the metadata;
   write, by the cluster, the metadata to each of a plurality of memory devices corresponding to the plurality of nodes, in response to a determination that the access frequency associated with the metadata is at least an access threshold, and a determination that the size of the metadata is at most a storage threshold; and
   write, by the node, information comprising the metadata to an object storage that stores data objects for the plurality of nodes, in response to at least one of a determination that the access frequency associated with the metadata is less than the access threshold or a determination that the size of the metadata is more than the storage threshold.

2. The distributed and deduplicating file system of claim 1, wherein writing the information comprising the metadata to the object storage comprises identifying a quantity of the information, comprising the metadata, which equals an object threshold, and then writing the quantity of the information comprising the metadata to the object storage.

3. The distributed and deduplicating file system of claim 2, wherein the object threshold is based on a size of a data structure which is internally managed as a chunk in the object storage, and using the object threshold to write the information comprising the metadata to the object storage enables the object storage to respond to a determination that a data object was written and then deleted by a file system by releasing the data object without needing to perform any copy-forward process on the data object.

4. The distributed and deduplicating file system of claim 1, wherein the memory devices comprise flash memory devices.

5. The distributed and deduplicating file system of claim 1, wherein determining whether the size of the metadata is more than the storage threshold comprises determining whether the size of the metadata is more than an available capacity in each of the plurality of memory devices.

6. The distributed and deduplicating file system of claim 1, wherein the plurality of instructions further causes the processor to store, by one other node in the cluster, the metadata to a memory device corresponding to the one other node, in response to the determination that the access frequency associated with the metadata is at least the access threshold and the determination that the size of the metadata is more than the storage threshold.

7. The distributed and deduplicating file system of claim 1, the object storage stores data in hard disk drives.

8. A computer program product comprising a non-transitory computer-readable medium having a computer-readable program code embodied therein to be executed by one or more processors, the program code including instructions to:
   identify, by a node in a cluster of a plurality of nodes, metadata associated with deduplicated data by deduplicating backup data, in response to receiving the backup data associated with a write operation to back up a data file;
   determine a frequency at which the metadata will be accessed and a size of the metadata in response to identifying the metadata;
   write, by the cluster, the metadata to each of a plurality of memory devices corresponding to the plurality of nodes, in response to a determination that the access frequency associated with the metadata is at least an access threshold, and a determination that the size of the metadata is at most a storage threshold; and
   write, by the node, information comprising the metadata to an object storage that stores data objects for the plurality of nodes, in response to at least one of a determination that the access frequency associated with the metadata is less than the access threshold or a determination that the size of the metadata is more than the storage threshold.

9. The computer program product of claim 8, wherein writing the information comprising the metadata to the object storage comprises identifying a quantity of the information, comprising the metadata, which equals an object threshold, and then writing the quantity of the information comprising the metadata to the object storage.

10. The computer program product of claim 9, wherein the object threshold is based on a size of a data structure which is internally managed as a chunk in the object storage, and using the object threshold to write the information comprising the metadata to the object storage enables the object storage to respond to a determination that a data object was written and then deleted by a file system by releasing the data object without needing to perform any copy-forward process on the data object.

11. The computer program product of claim 8, wherein the memory devices comprise flash memory devices.

12. The computer program product of claim 8, wherein determining whether the size of the metadata is more than the storage threshold comprises determining whether the size of the metadata is more than an available capacity in each of the plurality of memory devices.

13. The computer program product of claim 8, wherein the program code includes further instructions to store, by one other node in the cluster, the metadata to a memory device corresponding to the one other node, in response to the determination that the access frequency associated with the metadata is at least the access threshold and the determination that the size of the metadata is more than the storage threshold.

14. The computer program product of claim 8, the object storage stores data in hard disk drives.

15. A computer-implemented method for a distributed and deduplicating file system that stores backup metadata to object storage comprising:
identifying, by a node in a cluster of a plurality of nodes, metadata associated with deduplicated data by deduplicating backup data, in response to receiving the backup data associated with a write operation to back up a data file;
determining a frequency at which the metadata will be accessed and a size of the metadata in response to identifying the metadata;
writing, by the cluster, the metadata to each of a plurality of memory devices corresponding to the plurality of nodes, in response to a determination that the access frequency associated with the metadata is at least an access threshold, and a determination that the size of the metadata is at most a storage threshold; and
writing, by the node, information comprising the metadata to an object storage that stores data objects for the plurality of nodes, in response to at least one of a determination that the access frequency associated with the metadata is less than the access threshold or a determination that the size of the metadata is more than the storage threshold.

16. The computer-implemented method of claim 15, wherein writing the information comprising the metadata to the object storage comprises identifying a quantity of the information, comprising the metadata, which equals an object threshold, and then writing the quantity of the information comprising the metadata to the object storage.

17. The computer-implemented method of claim 16, wherein the object threshold is based on a size of a data structure which is internally managed as a chunk in the object storage, and using the object threshold to write the information comprising the metadata to the object storage enables the object storage to respond to a determination that a data object was written and then deleted by a file system by releasing the data object without needing to perform any copy-forward process on the data object.

18. The computer-implemented method of claim 15, wherein the memory devices comprise flash memory devices.

19. The computer-implemented method of claim 15, wherein determining whether the size of the metadata is more than the storage threshold comprises determining whether the size of the metadata is more than an available capacity in each of the plurality of memory devices.

20. The computer-implemented method of claim 15, wherein the computer-implemented method further comprises storing, by one other node in the cluster, the metadata to a memory device corresponding to the one other node, in response to the determination that the access frequency associated with the metadata is at least the access threshold and the determination that the size of the metadata is more than the storage threshold.

* * * * *